United States Patent [19]

Miki et al.

[11] Patent Number: 4,712,085
[45] Date of Patent: Dec. 8, 1987

[54] THERMISTOR ELEMENT AND METHOD OF MANUFACTURING THE SAME

[75] Inventors: Nobuyuki Miki; Hiroshi Yamaoka, both of Tokyo; Yoichi Tanaka, Chiba, all of Japan

[73] Assignee: TDK Corporation, Tokyo, Japan

[21] Appl. No.: 792,456

[22] Filed: Oct. 29, 1985

[30] Foreign Application Priority Data

Oct. 30, 1984 [JP] Japan ................. 59-228437
Oct. 30, 1984 [JP] Japan ................. 59-228438

[51] Int. Cl.$^4$ ............................................. H01C 7/10
[52] U.S. Cl. .............................. 338/22 SD; 29/612; 338/22 R
[58] Field of Search ............ 338/22 SD, 22 R, 32 H, 338/34; 29/593, 612, 613

[56] References Cited

U.S. PATENT DOCUMENTS

| | | | |
|---|---|---|---|
| 3,735,321 | 5/1973 | Bovenkerk | 338/22 SD X |
| 3,815,074 | 6/1974 | Nagata | 338/22 R |
| 3,901,067 | 8/1975 | Boardman et al. | 338/34 |
| 4,200,970 | 5/1980 | Schonberger | 338/22 SD |
| 4,426,542 | 1/1984 | Hotta et al. | 338/22 SD X |
| 4,584,552 | 4/1986 | Suzuki et al. | 338/32 H |

Primary Examiner—Clifford C. Shaw
Assistant Examiner—M. Lateef
Attorney, Agent, or Firm—Wyatt, Gerber, Schoup, Scobey & Badie

[57] ABSTRACT

A thermistor element for temperature measurement has a thermistor chip in wafer form and thin film electrodes formed on respective principal surfaces of the thermistor chip. The thin film electrodes are formed by evaporation. Lead wires are adhered to the thin film electrodes with heat-resisting conductive material. The assembled members are sealed with glass. The electrodes may be made of two-layer films.

5 Claims, 6 Drawing Figures

THERMISTOR ELEMENT AND METHOD OF MANUFACTURING THE SAME

BACKGROUND OF THE INVENTION

The present invention relates to the thermistor element which is, for example, suitable for use in temperature measurement with high accuracy and method of manufacturing the same.

Thermistor has the physical property such that its electrical resistivity widely varies with change in temperature. Especially, a NTC (negative temperature coefficient) thermistor whose electrical resistivity decreases with increase in temperature has a wide range of applications. One usage of such thermistor is temperature measurement.

FIG. 1 shows prior art thermistor element for temperature measurement typified by U.S. Pat. No. 3,815,074. Reference numeral 1 represents a thermistor chip of sinter powdery material. Thick film electrodes 2 and 3 are formed by firing heat-resisting conductive painted films containing nobel metal such as Ag, PdAg, Pt and Au to fix it to the both surfaces of the thermistor chip 1. Lead wires 4 and 5 are connected at their base portions to the electrodes 2 and 3 by firing the heat-resisting conductive material 6. The thermistor chip 1, electrodes 2 and 3 and base portions of the lead wires 4 and 5 thus assembled are embedded in a glass body 7.

However, in the prior art thermistor element, it is hard to obtain ohmic contact between the thermistor chip 1 and the thick film electrode 2 or 3 owing to frits contained in the heat-resisting conductive paint. For the reason, voltage dependancy or current dependancy characteristics of the variation in resistance values in such thermistor element becomes unstable, resulted from errors of characteristics such as B factor, resistance value, in certain circumstances.

Moreover, a large amount of noble metal such as Au or Pt is needed for forming the thick film electrodes 2,3 on the thermistor chip 1, which leads to high manufacturing cost. Furthermore, it is feared that the property of the thermistor chip 1 is deteriorated by baking the heat-resisting conductive paint, upon forming the thick film electrodes 2,3 or upon connecting the lead wires 4,5 to the electrodes 2,3 respectively. In that case, characteristic of the thermistor element is liable to be scattered.

It is an object of the present invention to overcome the above disadvantages of the prior art by providing a thermistor element with excellent ohmic contact, whereby to improve current (or voltage) dependancy characteristics of the variation in resistance values thereof.

It is another object of the present invention to provide a thermistor element with a high yield rate and with low manufacturing cost.

According to the present invention, there is provided a thermistor element comprising, a sintered thermistor chip in wafer form with two principal opposite surfaces, thin film electrodes evaporated on respective principal surfaces of the thermistor chip, lead wires with one of the ends being respectively adhered to the thin film electrodes with heat-resisting conductive material, and glass body for sealing the thermistor chip, the thin film electrodes and the adhered ends of the lead wires.

DESCRIPTION OF THE PREFERRED EMBODIMENT

Figure 2A:
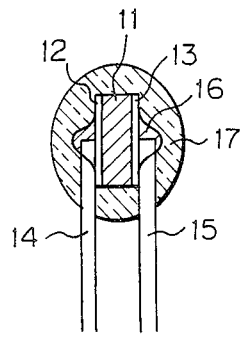
FIG. 2(a) is a vertical sectional view of a thermistor element of the first embodiment according to this invention.
Figure 2B:
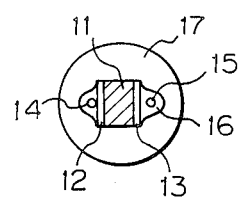
FIG. 2(b) is a horizontal sectional view of the same.

Referring to FIG. 2, there is shown a thermistor element of this invention. In FIG. 2, reference numeral 11 represents a thermistor chip which is manufactured out of a combination of several kinds of metal oxides. For example, it may be made of a composite material containing manganese oxide, nickel oxide and cobalt oxide. Thin film electrodes 12 and 13 are respectively formed on both surfaces of the thermistor chip 11 by evaporation. Lead wires 14 and 15 are respectively adhered to and electrically connected to the thin film electrodes 12 and 13 with heat-resisting conductive material 16. The lead wire may be, for example, Dumet wire which comprises Fe-Ni core wire coated with copper. The thermistor chip 11, thin film electrodes 12 and 13, end poritons of the lead wires 14 and 15, and heat-resisting conductive material 16 are sealed in glass body 17. For example, $SiO_2$-$PbO$-$K_2O$ type or $SiO_2$-$PbO$-$Na_2O$ type glass may be used as the glass body 17.

The electrode material used in this invention may be a metal such as W, Mo, Ti, Ta, Cu, Ag, Au, Pt and Pd, or an alloy consisting of two or more such metals. The thin film electrodes 12 and 13 are formed by evaporating such metal or alloy in vacuum on the surfaces of the thermistor chip 11, for example, at substrate temperature of 200° C. to 400° C. With thus formed thin film electrodes, excellent ohmic contact can be obtained between the thin film electrode 12 or 13 and the thermistor chip 11, since the electrode material does not contain frits which cause non-ohmic contact.

Next, the manufacturing method of the above thermistor element will be explained.

1. Powdery metal oxides to be combined are each weighed out to provide thermistor material having desired composition.

2. These powders are put into a ball mill together with water and steel balls, and are then mixed for a predetermined time.

3. The mixture is dried to be dehydrated, for example, with a drying device.

4. The dehydrated mixture is pre-sintered at a temperature between 800° C. and 1000° C.

5. The pre-sintered mixture is put into an oscillating mill with water, and is pulverized for a predetermined time to obtain fine powders.

6. The fine powders are put into together with water or appropriate binder such as polyvinyl alcohol, and are then mixed for a predetermined time. After this mixing, the material is molded in a desired shape (e.g. disc-like shape) having predetermined sizes.

7. The molded material is sintered in the atmosphere of air at a temperature between 1200° C. and 1400° C.

8. The sintered ingot material is sliced to obtain wafers. The wafer is lapped with a precise parallel lapping machine so that the thickness of the wafer becomes a predetermined one (for example, 0.15 mm to 0.50 mm).

9. The lapped wafer is cleaned and is then set on a holder. The holder is attached to a dome in a high-vacuum evaporation apparatus. Then, metal or alloy mentioned above is evaporated on one surface of the wafer under the condition that the wafer (substrate) temperature is between 200° C. and 400° C. and the degree of vacuum is higher than $10^{-5}$ TORR. Next, the other surface of the wafer is evaporated with the same metal or alloy, in the same manner. Thus, thin film electrodes are formed on both surfaces of the wafer, respectively. During the evaporation the dome is rotated at a constant speed. If gold is used for the electrode material, the material is firstly pre-heated for 30 to 60 seconds by flowing 80 ampere current in the gold wire. Then, the material is heated up to a temperature of 1400° C. to 1500° C. for 100 to 150 seconds by flowing 150 ampere current through it.

10. The wafer with the thin film electrodes is dice-cut to obtain thermistor chips.

11. The end portions of lead wires such as Dumet wires are respectively attached to the thin film electrodes formed on both surfaces of the thermistor chip, by the heat-resisting conductive material.

12. The thermistor chip having the thin film electrodes to which the lead wires are respectively connected is sealed with glass by a glass sealing apparatus to obtain desired thermistor element.

According to this method, the firing step in the prior art can be eliminated. Therefore, the thermistor material is no longer subjected to undesired thermal influence, so that the thermistor element having stable characteristics with high yield rate can be obtianed.

Figure 3A:
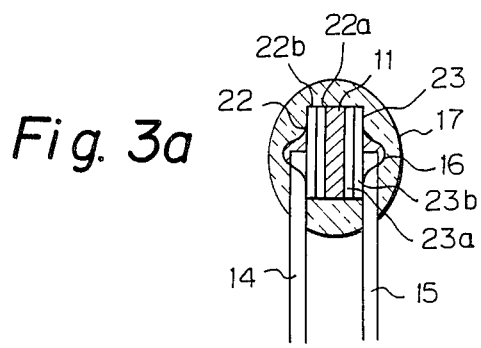
FIG. 3(a) is a vertical sectional view of a thermistor element of the second embodiment according to this invention.
Figure 3B:
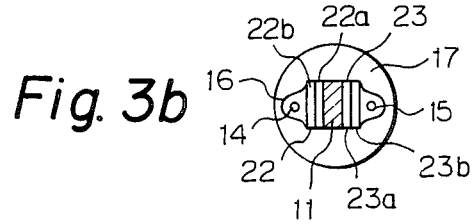
FIG. 3(b) is a horizontal sectional view of the same.

FIG. 3 shows a variation of the thermistor element consisting of two or more such metals. Different type of electrode materials are used for upper layer films and for lower layer films.

With this type of the thermistor element, the upper layer films may be formed of non-oxidizable metal such as Ag, Au, Pt and Pd and the lower ones may be formed of another low cost metal. In this case, the thermistor element can be manufactured at a lower cost. Further, as the two-layer electordes 22, 23 are tightly adhered to the thermistor chip 11, it is hard for them to be peeled off from the thermistor chip 11 during manufacturing process such as the dice-cutting process as mentioned above. Accordingly, the thermistor element can be manufactured with high yield rate and with excellent characteristics.

In case of manufacturing this type of the thermistor element, the lower layer films are firstly formed on both surfaces of the wafer by evaporation of the first type of metal or alloy and then the upper layer films are formed on the lower layer films by evaporation of the second type of metal or alloy. If the lower and upper layer films are made of titanium and gold, respectively, titanium is firstly pre-heated for 30 to 60 seconds by 80 ampere current, and is then heated for 15 to 45 seconds by 150 ampere current. After evaporating titanium on both surfaces of the wafer, gold is pre-heated for 30 to 60 seconds by 80 ampere current, and is then heated for 100 to 150 seconds by 150 ampere current. Other manufacturing steps are same as those mentioned in the explanation concerning the manufacturing method for the thermistor element shown in FIG. 2.

Next, characteristics of the thermistor elements of this invention will be described in comparison with the prior art.

Table 1 shows relationships of current value vs votage value in thermistor elements having resistance value of 10 k.ohm at 25° C.

TABLE 1

| Sample No. | current value | | | | | |
|---|---|---|---|---|---|---|
| | 1 μA | 5 μA | 10 μA | 50 μA | 70 μA | 100 μA |
| No. 1 | 10 mV | 49.985 mV | 99.960 mV | 499.60 mV | 699.37 mV | 998.40 mV |
|  | (10.000 k. ohm) | (9.9970 k. ohm) | (9.9960 k. ohm) | 9.9920 k. ohm) | (9.9910 k. ohm) | (9.9840 k. ohm) |
| No. 2 | 10 mV | 49.980 mV | 99.940 mV | 499.40 mV | ˙698.74 mV | 996.60 mV |
|  | (10.000 k. ohm) | (9.9960 k. ohm) | (9.9940 k. ohm) | (9.9880 k. ohm) | (9.9820 k. ohm) | (9.9660 k. ohm) |
| No. 3 | 10 mV | 49.980 mV | 99.940 mV | 499.50 mV | 698.88 mV | 997.30 mV |
|  | (10.000 k. ohm) | (9.9960 k. ohm) | (9.9940 k. ohm) | (9.9900 k. ohm) | (9.9840 k. ohm) | (9.9730 k. ohm) |
| No. 4 | 10 mV | 49.980 mV | 99.920 mV | 499.15 mV | 698.18 mV | 995.90 mV |
|  | (10.000 k. ohm) | (9.9960 k. ohm) | (9.9920 k. ohm) | (9.9830 k. ohm) | (9.9740 k. ohm) | (9.9590 k. ohm) |
| No. 5 | 10 mV | 49.970 mV | 99.860 mV | 498.25 mV | 696.58 mV | 992.61 mV |
|  | (10.000 k. ohm) | (9.9940 k. ohm) | (9.9860 k. ohm) | (9.9650 k. ohm) | (9.9511 k. ohm) | (9.9261 k. ohm) |
| No. 6 | 10 mV | 49.970 mV | 99.820 mV | 497.11 mV | 694.55 mV | 992.61 mV |
|  | (10.000 k. ohm) | (9.9940 k. ohm) | (9.9820 k. ohm) | (9.9421 k. ohm) | (9.9221 k. ohm) | (9.8912 k. ohm) | according to this invention. In this figure, the same reference numeral denotes the same member in FIG. 2. As seen from FIG. 3, thin film electrodes 22 and 23 are made of two-layer films, respectively. That is, the thin film electrode 22 consists of a lower layer film 22a and an upper layer film 22b, while the thin film electrode 23 consists of a lower layer film 23a and an upper layer film 23b. On the upper layer films 22b and 23b are respectively attached to the lead wires 14 and 15 by the heat-resisting conductive material.

Figure 1A:
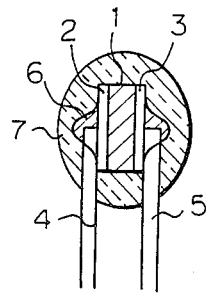
FIG. 1(a) is a vertical sectional view of a thermistor element of the prior art.
Figure 1B:
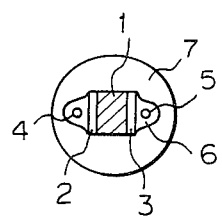
FIG. 1(b) is a horizontal sectional view of the same.

The electrode material for the lower layer films 22a and 23a may be a metal such as W, Mo, Ti, Ta, Cu, Ag, Au, Pt and Pd, or an alloy consisting of two or more such metals. On the other hand, the electrode material for the upper layer films 22b and 23b may be a non-oxidizable metal such as Ag, Au, Pt and Pd, or an alloy Measurements were done at twenty times in silicone oil and at a sample temperature of 25° C. Each value is a measured average one in measurements of twenty times. A value in parenthesis in the Table 1 shows a resistance value of the thermistor element for each current value. Sample No. 1 to sample No. 3 are examples of thermistor elements according to the first embodiment of this invention (FIG. 2). Sample No. 4 is an example of a thermistor element according to the second embodiment of this invention (FIG. 3). Sample No. 5 and Sample No. 6 are comparative examples of prior art thermistor elements (FIG. 1). The thin film electrodes in Sample No. 1, No. 2 and No. 3 are made of Au, Ag and Cu, respectively. The upper layer films and lower layer films of the thin film electrodes in Sample No. 4 are made of Au and Ti, respectively. The thick film electordes in Sample No. 5 and Sample No. 6 are made of Au paint and PdAg paint, respectively.

Table 2 shows relationships of current value vs. variation rate of resistance value in the thermistor elements evaluated from the results in Table 1. The variation rate A is written as following formula.

$$A = \frac{R_I - R_O}{R_O} \times 100 \, (\%)$$

TABLE 2

| Sample NO. | current value | | | | | |
|---|---|---|---|---|---|---|
| | 1 μA | 5 μA | 10 μA | 50 μA | 70 μA | 100 μA |
| No. 1 | — | −0.030% | −0.040% | −0.080% | −0.090% | −0.160% |
| No. 2 | — | −0.040% | −0.060% | −0.120% | −0.180% | −0.340% |
| No. 3 | — | −0.040% | −0.060% | −0.100% | −0.160% | −0.270% |
| No. 4 | — | −0.040% | −0.080% | −0.170% | −0.260% | −0.410% |
| No. 5 | — | −0.060% | −0.140% | −0.350% | −0.489% | −0.739% |
| No. 6 | — | −0.060% | −0.180% | −0.579% | −0.779% | −1.088% |

TABLE 3

| Resistance value range | current value |
|---|---|
| 200 ohm–20 k. ohm | 100 μA |
| 20 k. ohm–200 k. ohm | 10 μA |
| 200 k. ohm | 1 μA (0.1 μA) |

Where $R_O$ and $R_I$ are the resistance values of the thermistor element at the current value of 1 μA and Iμa, respectively.

It is understood from these tables that the thermistor elements (sample No. 1 to No. 4) exhibit smaller variation rate A of the resistance value as compared with the prior art ones (sample No. 5 and No. 6). Where the current value is 100 μA, absolute value of the rate A of this invention is smaller than 0.5%, whereas the same of the prior art is larger than 0.5%. This fact indicates that the thermistor element of this invention has more excellent ohmic characteristics than the prior art one. Accordingly, this inveniton can be sufficiently applied to temperature measurement with high accuracy which is in great demand, due to its stable characteristics.

Further, it is usual to use the thermistor element whose resistance value is between 200 ohms and 2 mega ohms at room temperature. In order to reduce a bad influence caused from self-heating, value of current flowing through the thermistor element is roughly predetermined for the rank of its resistance value, for example, as the following table 3. Although as shown in this table, current value range for usual measurement is between 1.0 μA (0.1 μA) to 100 μA, it is preferred to maintain the stable characteristic beyond the above range, which is impossible utilizing prior art. However, this can be attained by this invention.

We claim:
1. A thermistor element comprising:
   a sintered thermistor chip in wafer form with two principal opposite respective surfaces;
   thin film electrodes evaporated on said principal opposite respective surfaces of the thermistor chip;
   lead wires each having one end which is respectively adhered to each of the thin film electrodes with heat-resisting conductive material; and
   a glass body for sealing the thermistor chip, the thin film electrodes and the adhered ends of the lead wires;
   wherein each of the thin film electrodes comprises a lower layer film and an upper layer film, and the lower layer film is formed by evaporating at least one metal selected from a group consisting of W, Mo, Ti, Ta, Cu, Ag, Au, Pt and Pd, and the upper layer film is formed by at least one metal selected from a group consisting of Ag, Au, Pt and Pd, and the material for the upper layer film is different from the material for the upper layer film.

2. A method of manufacturing a thermistor element comprising steps of:
   molding powdery materials of combined metal oxides and then sintering thus molded material;
   slicing the sintered material to obtain wafers and lapping the surfaces of the wafers;
   evaporating metal or alloy on one surface of the wafer and then another surface of the same to form the thin film electrodes;
   cutting the wafer evaporated with the thin film electrodes to obtain thermistor chips;
   adhering lead wires to the thin film electrodes on the wafer chip respectively by heat-resisting conductive material; and
   sealing the thermistor chip, the thin film electrodes and the adhered ends of the lead wires with glass.

3. The method according to claim 2, wherein the thin film electrode is evaporated by using at least one selected from a group consisting of W, Mo, Ti, Ta, Cu, Ag, Au, Pt and Pd.

4. The method according to claim 2, wherein the thin film electrode comprises a lower layer film and an upper layer film.

5. The method according to claim 4, wherein the lower layer film is formed by evaporating at least one selected from a group consisting of W, Mo, Ti, Ta, Cu, Ag, Au, Pt and Pd, and the upper layer film is formed by evaporating at least one selected from a group consisting of Ag, Au, Pt and Pd, and the material for the lower layer film is different from that for the upper layer film.

* * * * *